3 Sheets—Sheet 1.

G. MALO.
SCREW PROPELLER.

No. 8,529. Patented Nov. 18, 1851.

G. MALO.
SCREW PROPELLER.

No. 8,529.

Patented Nov. 18, 1851.

G. MALO.
SCREW PROPELLER.
No. 8,529.                                      Patented Nov. 18, 1851.
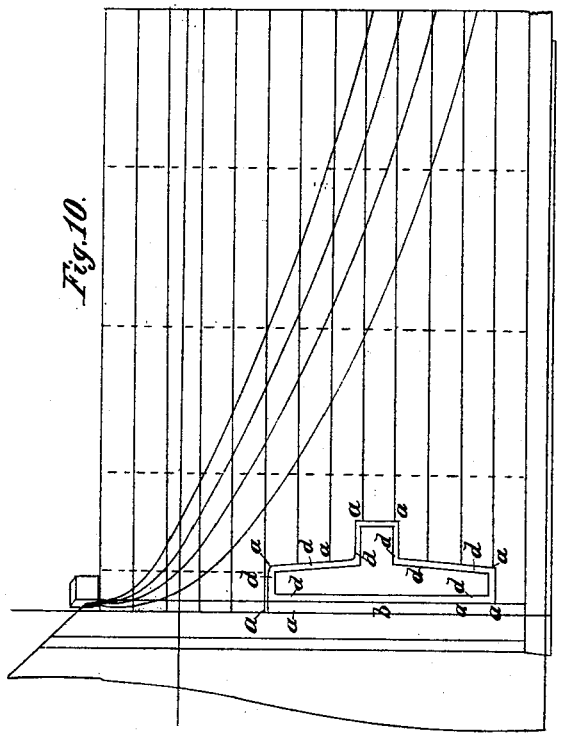
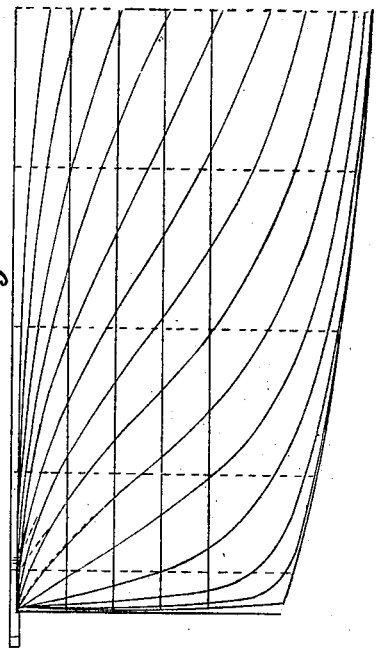
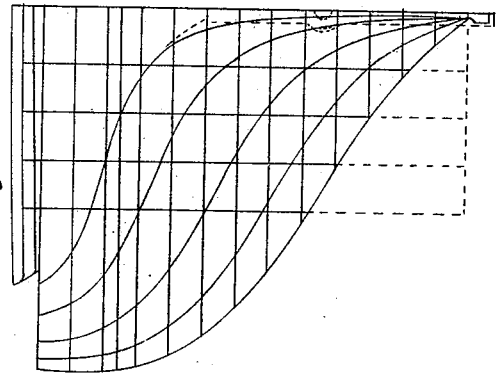

UNITED STATES PATENT OFFICE.

GASPARD MALO, OF DUNKIRK, FRANCE.

SCREW-PROPELLER.

Specification of Letters Patent No. 8,529, dated November 18, 1851.

*To all whom it may concern:*

Be it known that I, GASPARD MALO, of Dunkirk, in the Republic of France, ship-owner, have invented certain Improvements in Propelling Vessels, and that the following is a full, clear, and exact description of the principle or character which distinguishes them from all other things before known and of the usual manner of making, modifying, and using the same.

My invention consists in the employment for propelling vessels of a screw composed of two or more series of movable vanes or wings, each series attached to a separate shaft and the shafts placed one within the other and provided with keys or other equivalent means of connecting and disconnecting so that the shafts can be turned on each other for the purpose of placing the two or more series of vanes behind each other for sailing purposes, or at different parts of the circle to increase the puddle surface when used for propelling.

I will now proceed to describe the details of my invention.

Figure 1:
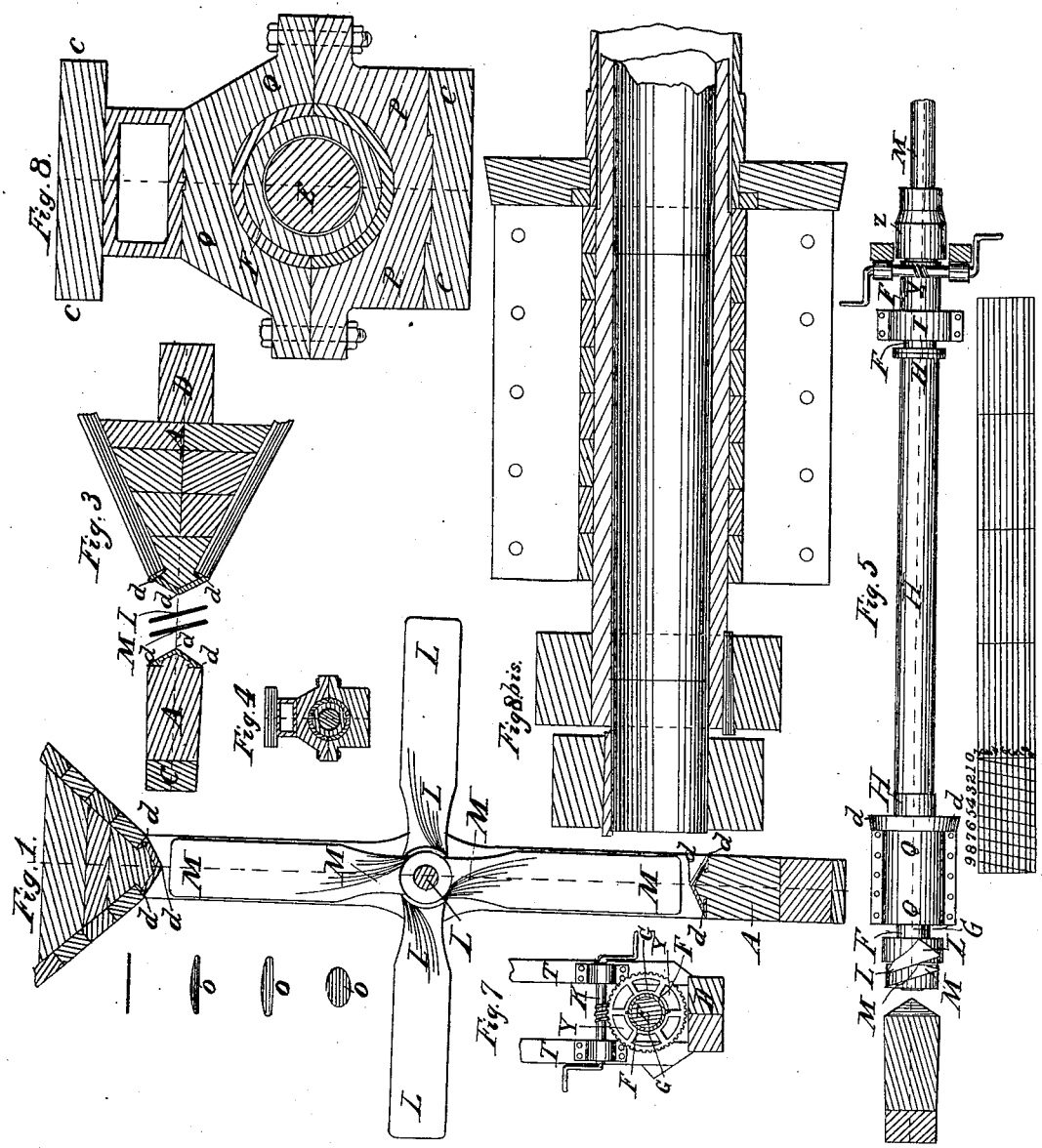
Figure 2:
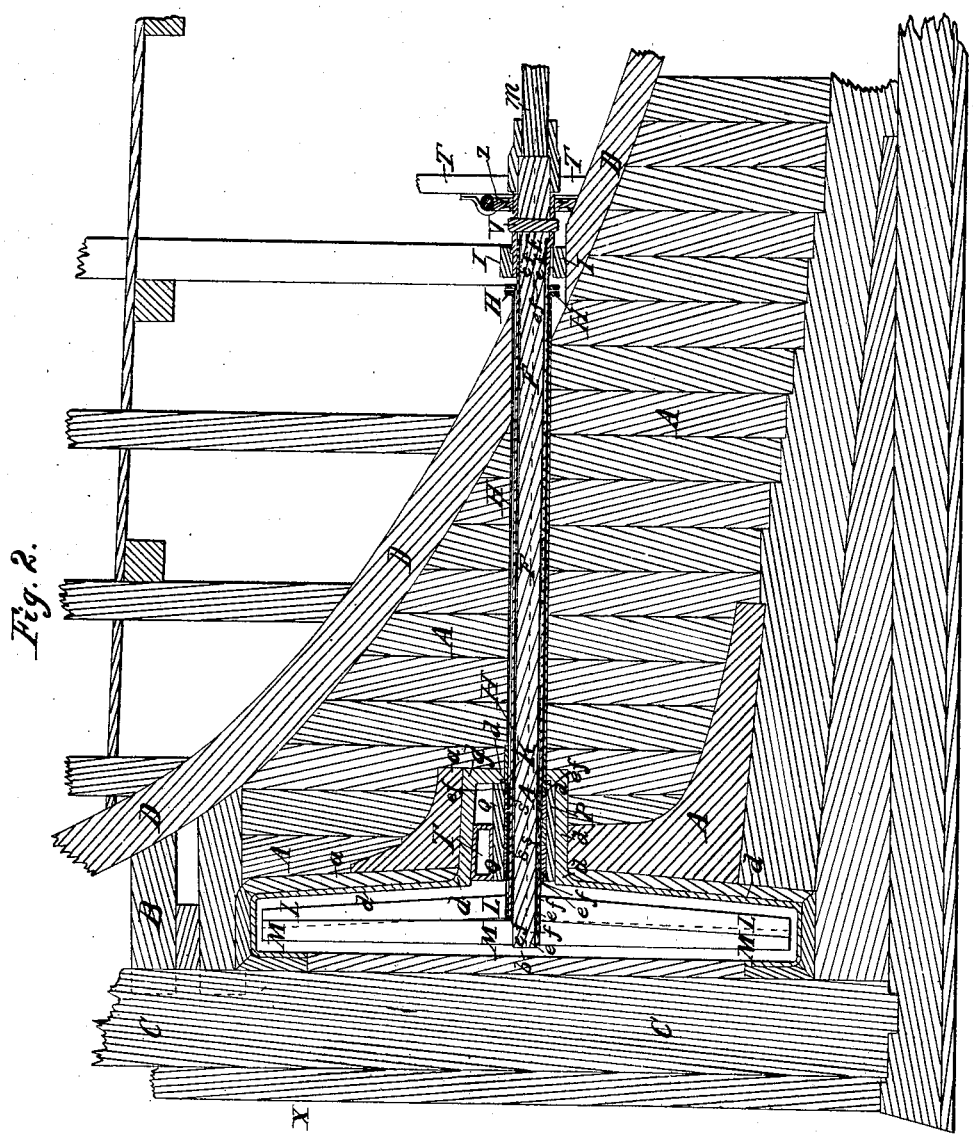

My invention has for its object to remedy the defects hitherto experienced in employing a screw with movable vanes. The construction of this screw is represented in detail in the annexed drawings (Figs. 1 and 2). It is composed of two or three pairs of independent vanes or wings. One of these pairs is fixed on the extreme end of a shaft in the ordinary way. A second pair is keyed on the end of a tube which encircles the shaft of the first pair. A third pair, if necessary, can be fixed in the same manner on the end of a second tube encircling the first tube. The two or three concentric shafts thus arranged one within the other are passed after the manner of simple shafts into a tubular stuffing-box. Beyond this stuffing-box and the bearing connected therewith these shafts are uniformly increased in diameter and have then holes cut in them through which (the holes of each shaft being brought exactly in a line with those of the other or others of them) a strong key is passed so as to fix the two or three shafts together and unite them as one shaft, either in the position which they respectively occupy when the screw is in movement, or in that which they occupy when it is at rest and folded back. In order to pass from one of these positions to the other, it is requisite to turn one of the shafts within the other, about one fourth or one sixth of a revolution, according as there may be two or three pairs of vanes. This adjustment is effected when required by hand, (that is to say) by turning an endless screw which works into a pinion fixed in the inner shaft. Any other suitable mechanical arrangement may be employed for the same purpose.

Between the concentric shafts a small annular space is left of about one fourth or one fifth of an inch which extends throughout their whole length except at the bearings and at the hinder end where the innermost shaft is slightly increased in diameter for about a length of three and a half to four inches and comes in contact for that space with the other shaft. The increased portion of the shaft near the bearings allows the shafts to rest on one another, the increased part at the outer end prevents besides the shafts from becoming loose one in the other at that end which projects from the bearing. Moreover the inner shaft is thus strengthened at the very part on which the vane or wing is to be keyed. Should the water enter the vessel through this small annular space that end of the innermost shaft which enters the hold should be well packed with hemp or any other suitable material. In order to diminish or prevent the possibility of the shafts sticking together, some concrete fatty matter is poured into the annular space, in order to prevent the entry of water at that place. The two or three pairs of vanes or wings are so placed and curved as to project one over the other, and in the least possible space. There remains thus between the superposed vanes only about two inches of play. The screws thus composed may in a vessel having a large draught of water, have a large diameter. For an apparatus of moderate power the screw should have a sufficiently large surface with a width of vane or wing not exceeding the thickness of the stern post. Should the engine be very powerful the same result could be obtained especially if the stern post were to be widened by an inch or two and the rapidity of the revolutions of the driving shaft increased. Four vanes or wings would suffice, but six may be used if preferred, each of the wings should be in the shape of a large oar and made pretty much in the same manner. The breadth of the opening made in the dead-wood to receive such a screw need only be about from eighteen inches to two feet from the front to the back. Thus in ships of a great draught a sufficient portion of dead wood will be left intact above and below to render the poop solid, and this opening will allow of a sufficient width behind it to permit the stern-post to be strengthened.

These arrangements may be made in a ship already built without any damage being done to it and without any modification in the shape of the bottom or submerged part of the hull.

The drawing Figure 1 represents the fixings of a screw for an auxiliary apparatus of 150 horse power in a man of war. The screw is there represented with four vanes or wings but it is easy to conceive the same with six or any number of vanes instead of four.

*The end bearing for the propeller shaft.*— Hitherto an end bearing for the shaft has been very generally dispensed with, the stuffing box being made to answer the purpose of a bearing, by inserting a small collar at the stern end; the result of this objectionable arrangement is that when this part of the stuffing box becomes worn away by friction the shaft shakes about loosely in this bearing. Consequently when it is too much worn away, it becomes requisite, in order to remedy the mischief, to unship the screw, the shaft and the whole of the stuffing box, which is a long difficult and very expensive operation, and not practicable with the means ordinarily at disposal on board ship. Some times bearings have been placed on the frame of the screw in ships in which the screw (when not required) is hoisted up into a sort of well, these bearings, which wear out quickly owing to their shortness can be easily got at and repaired, but still they do not do away with the necessity of another bearing at the end of the stuffing box. In both cases the stern-post, which alone carries the rudder has to bear the strain of the screw, so that both the rudder and the screw are liable to the same accidents. To remedy this evil I propose to leave the screw at its outer end without any bearing, and to support its inner end by a strong bearing sufficiently hard not to be worn out by the longest voyage, and which may be easily examined or changed. This bearing must be very long not to be worn out rapidly. By the arrangement hereafter described, it may be made 25, 30 or even 40 inches long. It will be easy to conceive that such a bearing being in use only when the engine is working, will last longer than the provision of fuel should even this be renewed several times during the voyage. The same results cannot be obtained if the screw be as usual loose on its shaft, the wear of which is to be calculated according to the length of the navigation, and not according to the provision of fuel, which point ought to be taken into consideration with reference to the shaft and the bearings as the bearings generally used are much shorter than mine.

*The frame.*—The improved screw with movable vanes requires to have in a large ship already built an opening of which the length from front to back may not be so extensive as to require any important alteration in the construction of the vessel. So to speak the opening might be made by just sawing through the dead wood and planks, and this without damaging the hull. The metallic frame previously filled with wood such as is represented under the letters *d d d* is then to be put in its place. This frame is made in one piece and nailed firmly to the dead wood. It is curved into a knee form and forms a rabbet joint with the ribs of the planking. Its angular section gives it considerable rigidity without requiring it to be of great thickness, at the same time this form of section facilitates the motion of the water. In a ship while building the frame should be put in place either before the ribs or at the same time with them and then filled in with wood, the joints of which must be so disposed as not to fall in with the rabbet. This frame incloses also the recess made for the end bearing. In its cross section this frame is very massive throughout and of substance sufficiently strong to hold the bearing and stuffing box.

*Description of the drawings.*—A is the deadwood; B, the wing transom; C, stern post and inner post; D, keels on which is cut away to allow the stuffing box to pass through. Two ties should be added here to strengthen this weak part of the ship; *a a a a*, outline of the opening to be made in the dead wood of a ship already built. On the part *b b b* which forms the back part of this outline, a small angular piece of wood is placed in order to facilitate clearance of the water expelled by the screw.

*d d d d* is the metal frame made in one piece. This frame is to be filled in as before stated with wood before being put in its place in the case of ships already built; but in ships to be built, the frame having been first set in its place should be filled up with wood in proportion as the pieces composing the dead wood are put in their place. This frame is made angular in its cross section, in order to facilitate the movement of the water and to obtain the greatest possible strength from the quality of material employed. This frame is of solid metal throughout the parts surrounding the recess. It forms a rabbet joint throughout its circumference. This frame which is nailed to the dead wood may be strengthened by two or four straps, does away with all necessity for any other iron work to compensate for the portion of the dead wood cut away for the passage of the screw.

E is the inner shaft which carries the second pair of the vanes of the screw. This shaft is increased in diameter on the front of the bearing I in order to compensate for the stuff cut away to form the mortise to receive the wedge whereby the shaft is enabled to resist the power of torsion of the entire screw. This metal shaft is united at its front end by a coupling to the iron shaft which continues it on to the engine.

The reaction of the screw in backing the vessel is thrown on the bearing I by means of an increase in diameter of the shaft E. The more important reaction required for the forward course is supposed to be exerted on a point at the end of the front shaft of the engines.

F is a hollow shaft which carries the first pair of vanes or wings and is also increased in diameter in front of the bearing I. This shaft is thus solid enough to allow of the holes being cut to insert the key or keys with all desirable strength.

H is a common stuffing box. It begins at the back of the recess in the aperture made for the screw where it is fitted with a washer $k$ bedded in the thickness of the frame $d\ d$, and secured by screws if it is feared that the stuffing-box may yield toward the front. To prevent the stuffing box from receding toward the back there is a projector which presses against the front face of the frame.

Between the tubular stuffing box and the shaft F, there is an annular space of about half an inch into which the water enters freely. This extra space allows me to increase the thickness of the shaft F, at the part behind the stuffing-box, that is to say, at that part which rests on and turns in contact with the bearing P Q R S, and at that part to which the screw is keyed.

I is a bearing for the shaft of the screw, strongly secured to the keelson. On this bearing takes place the reaction of the screw when the engine is backed.

L is the first pair of wings or vanes attached to the strengthened end of the shaft F and secured by keys or by bolts; M, the second pair of vanes or wings fixed on the shaft E with keys, and also further secured by a pin passed through the shaft F.

P Q R S is the end bearing.

P is the sliding support made in one piece of gun metal, fixed by a dove-tail groove on the lower side of the frame of the recess. This piece which cannot wear out is supposed to be placed before the wings or vanes of the screw have been fixed in.

Q is the cap of the bearing which is secured to the support by bolts as usual; this cap can be unfixed when the wedge T is removed, and it may be either in one piece or composed of two or three parts combined lengthwise, and in either case the portion of the dead wood above the recess is connected by means of iron plates to the portion below it. This cap ends in a large flat part arranged to receive the wedge T; R, a lower packing of the bearing. It is divided into pieces sufficiently small to allow of their being passed between the back of the bearing and the first pair of vanes or wings L so that this bearing may be changed without unfixing any thing; S, upper packing of the bearing. It is divided into several pieces in order that it may be unfixed without meeting any impediment in the fixing of the iron plates hereinbefore referred to, but which are not shown in the drawing; T, wedge which is forcibly driven in, in order to bear the weight which is above the recess on the pieces which are below. The action of this wedge combined with that of the iron plates before referred to, restores to the whole dead wood as much solidity as if there had been no aperture made for the placing of the bearing; V, iron wedge which fixes the shaft F on the shaft E, so that the pair of vanes L project over the pair M, and on the stern-post so that these two branches may make between them a right angle; Y, pinion fixed on the shaft F by means of which a movement of rotation round the shaft E is given by the crank and endless screw, so as to place the vane in a position of rest or in a position of action; Z, coupling in wrought or cast iron, and in one or more pieces, which connects the shaft E with the iron shaft $m$ which prolongs it on to the engines. The shaft E and the shaft $m$ should be adjusted with respect to one another or to the coupling in such a manner that in the forward course the reaction of the screw may be exerted on the end of the shaft in front of the engines.

Fig. 1 on the large scale of the plan represents a section through a transverse plan of the aperture of the screw; the vanes have the degree of thickness indicated at O, by the cross sections $o$; the wings or vanes of the screws are here shown in their unfolded state. Fig. 2 on the same scale is a longitudinal section through a plan of the stern of a boat, showing all its details; the vanes or wings are represented as projecting one over the other. Fig. 3 on the same scale represents a section through a horizontal plan. The wings or vanes are here shown projected one over the other. Fig. 4 is a section of the end bearing showing the wedge which completes the filling in of the recess. Fig. 5 is a plan representing several of the details especially those of the stuffing box. Fig. 7 represents the details of the machinery for turning by hand one pair of wings or vanes; any other arrangement might be used. Fig. 8 and $8^{bis}$ are a repetition of Fig. 4 on a scale four times larger. Figs. 9, 10 and 11 on the small scale are diagrams of the lines of a ship's timbers. The three last figures refer to a ship of the line. The full lines indicate the actual shape of a vessel supposed to be built, the dotted lines indicate the shape as modified by the introduction of a screw with movable vanes or wings. It is easy to see that this modification is very nearly insignificant.

And having now described the nature of my said invention, and in what manner the same is to be performed I declare that what I claim as my invention and desire to secure by Letters Patent is—

Arranging two or more series of narrow blades, such as above described, each series on a separate shaft and the shafts one within the other and provided with keys or other equivalent means of securing them to each other, substantially as specified, so that the two or more shafts may be turned on each other and be re-secured to place the series of vanes directly behind each other for sailing purposes and at different parts of the circle for propelling.

In testimony that the above is a true description of my said invention and improvement I have hereto set my hand this sixteenth day of May in the year eighteen hundred and fifty one.

G. MALO.

Witnesses:
   Ase Davnbergh,
   I. Forcade.